US00RE45135E

(19) United States
(12) Reissued Patent
Kim et al.

(10) Patent Number: US RE45,135 E
(45) Date of Reissued Patent: Sep. 16, 2014

(54) METHOD OF REMOVING BLOCKING ARTIFACTS IN A CODING SYSTEM OF A MOVING PICTURE

(75) Inventors: Hyun Mun Kim, Rockville, MD (US); Jong Beom Ra, Taejeon-si (KR); Sung Deuk Kim, Taejeon-si (KR); Young Su Lee, Seoul (KR)

(73) Assignee: LG Electronics Inc., Seoul (KR)

(21) Appl. No.: 13/176,814

(22) Filed: Jul. 6, 2011

Related U.S. Patent Documents

Reissue of:
(64) Patent No.: 6,240,135
Issued: May 29, 2001
Appl. No.: 09/065,577
Filed: Apr. 24, 1998

U.S. Applications:
(63) Continuation of application No. 11/834,312, filed on Aug. 6, 2007, now Pat. No. Re. 42,851.

(30) Foreign Application Priority Data

Sep. 9, 1997 (KR) ..... 97-46368

(51) Int. Cl.
*H04B 1/66* (2006.01)
*G06K 9/40* (2006.01)

(52) U.S. Cl.
USPC ..... 375/240.01

(58) Field of Classification Search
USPC ..... 375/240.01, 240.12, 240.13, 240.15, 375/240.24, 240.25, 240.26, 240; 348/420.1, 403.1, 607; 382/236, 250, 382/252, 268, 275; 358/433, 432, 403
IPC ..... H04B 1/66; G06K 9/40
See application file for complete search history.

(56) References Cited

U.S. PATENT DOCUMENTS 5,229,864 A * 7/1993 Moronaga et al. ..... 382/261
5,262,854 A 11/1993 Ng
5,367,385 A * 11/1994 Yuan ..... 358/465
5,436,666 A 7/1995 Astle (Continued)

OTHER PUBLICATIONS

Byeungwoo Jeon et al, Blocking Artifacts reduction in image compression with block boundary discontinuity criteron, Circuits and System for Video Technology, IEEE Transactions on, vol.: Jun. 8, 1998, pp. 345-357.*

(Continued)

*Primary Examiner* — Tung Vo
(74) *Attorney, Agent, or Firm* — Fish & Richardson P.C.

(57) ABSTRACT

A method of coding a moving picture reduces blocking artifacts. The method includes defining pixel sets S0, S1, S2 around a block boundary, selectively determining a deblocking mode as a default mode or a DC offset mode depending on the degree of blocking artifacts. If the default mode is selected, frequency information is obtained around the block boundary per pixel using a 4-point DCT kernel, for example, a magnitude of a discontinuous component belonging to the block boundary is replaced with a minimum magnitude of discontinuous components belonging to the surroundings of the block boundary in the frequency domain and the replacing step is applied to the spatial domain. If the DC offset mode is selected and a determination is made to perform DC offset mode, the blocking artifacts in a smooth region are removed in the DC offset mode.

21 Claims, 5 Drawing Sheets

(56) References Cited

U.S. PATENT DOCUMENTS

| | | | | | |
|---|---|---|---|---|---|
| 5,526,295 | A | | 6/1996 | Astle | |
| 5,539,664 | A | | 7/1996 | Haghighi et al. | |
| 5,565,921 | A | * | 10/1996 | Sasaki et al. | 375/240.13 |
| 5,585,852 | A | | 12/1996 | Agarwal | |
| 5,590,064 | A | * | 12/1996 | Astle | 708/203 |
| 5,596,659 | A | * | 1/1997 | Normile et al. | 382/253 |
| 5,608,652 | A | * | 3/1997 | Astle | 708/203 |
| 5,614,952 | A | | 3/1997 | Boyce et al. | |
| 5,629,778 | A | * | 5/1997 | Reuman | 382/252 |
| 5,635,985 | A | | 6/1997 | Boyce et al. | |
| 5,646,686 | A | | 7/1997 | Pearlstein | |
| 5,677,736 | A | * | 10/1997 | Suzuki et al. | 375/240.24 |
| 5,680,129 | A | | 10/1997 | Weinberger et al. | |
| 5,740,283 | A | * | 4/1998 | Meeker | 382/248 |
| 5,764,374 | A | | 6/1998 | Seroussi et al. | |
| 5,767,907 | A | | 6/1998 | Pearlstein | |
| 5,777,677 | A | | 7/1998 | Linzer et al. | |
| 5,808,683 | A | | 9/1998 | Tong et al. | |
| 5,818,530 | A | | 10/1998 | Canfield et al. | |
| 5,825,424 | A | | 10/1998 | Canfield et al. | |
| 5,903,679 | A | * | 5/1999 | Park | 382/253 |
| 5,911,008 | A | * | 6/1999 | Niikura et al. | 382/236 |
| 6,000,000 | A | | 12/1999 | Hawkins et al. | |
| 6,028,967 | A | * | 2/2000 | Kim et al. | 382/268 |
| 6,040,879 | A | * | 3/2000 | Park | 375/240.27 |
| 6,104,434 | A | * | 8/2000 | Nakagawa et al. | 375/240.16 |
| 6,130,911 | A | | 10/2000 | Lei | |
| 6,314,209 | B1 | * | 11/2001 | Kweon et al. | 382/243 |
| 8,265,149 | B2 | | 9/2012 | Jung et al. | |
| 8,270,474 | B2 | | 9/2012 | Kim et al. | |
| 8,300,689 | B2 | | 10/2012 | Cho et al. | |
| 8,306,342 | B2 | | 11/2012 | Kim et al. | |
| 8,325,805 | B2 | | 12/2012 | Cho et al. | |
| 8,331,433 | B2 | | 12/2012 | Kim et al. | |
| 8,345,748 | B2 | | 1/2013 | Kim et al. | |
| 8,355,589 | B2 | | 1/2013 | Kim et al. | |
| 8,374,248 | B2 | | 2/2013 | Cho et al. | |
| 8,406,291 | B2 | | 3/2013 | Kim et al. | |
| 8,406,545 | B2 | | 3/2013 | Choi et al. | |
| 8,451,893 | B2 | | 5/2013 | Cho et al. | |
| 8,472,733 | B2 | | 6/2013 | Cho et al. | |
| 8,472,734 | B2 | | 6/2013 | Cho et al. | |
| 8,509,310 | B2 | | 8/2013 | Kim et al. | |
| 2012/0258699 | A1 | | 10/2012 | Kim et al. | |
| 2013/0011058 | A1 | | 1/2013 | Kim et al. | |

OTHER PUBLICATIONS

Barzykina, E et al., Removal of blocking artifacts using random pattern filtering, Image Processing, 1999 International Conference, vol. 3, 1999, pp. 904-908 vol. 2.*

Mei-Yin Shen te al., Fast compression artifact reduction technique based on nonlinear filter, Circuits and Systems 1999. ISCAS '99. Proceedings of the 1999 IEEE International Symposium on, vol. 4, 1999, pp. 179-182.*

Yung-Kai Lai et al., Removal of blocking artifacts of DCT transform by classified space-frequency filtering, Signals, System and Computers, 1995, Conference Record of the Twenty-Nine Asilmar Conference on, vol. 2, 1996, pp. 1457-1461.*

Kasezawa, T., Blocking artifacts reduction using discrete cosine transfomr, Consumer Electronics, IEEE Transactions on, vol. 43 Issue: 1, Feb 1997, pp. 48-55.*

Avideh Zakhor, "Iterative Procedures for Reduction of Blocking Effects In Transform Image Coding", IEEE Transactions On Circuits and Systems For Video Technology, vol. 2, No. 1, pp. 91-95 (Mar. 1992).

Yongyi Yang et al., "Regularized Reconstructions to Reduce Blocking Artifacts of Block Discrete Cosine Transform Compressed Images", IEEE Transactions On Circuits and Systems For Video Technology, vol. 3, No. 6, pp. 421-432 (Dec. 1993).

Gary J. Sullivan et al., "Motion Compensation for Video Compression Using Control Grid Interpolation", IEEE International Conference, pp. 2713-2716 (1991).

G. de Haan et al., "IC For Motion-Compression 100Hz TV With Natural-Motion Move-Mode", IEEE Transactions On Consumer Electronics, vol. 42, pp. 165-174 (Feb. 1996).

Özcelik, Taner et al., "Image and Video Compression Algorithms Based on Recovery Techniques Using Mean Field Annealing", Proceedings of the IEEE, vol. 83, No. 2, pp. 304-316, Feb. 1995.

Nakajima, Yasuyuki, et al., "A PEL Adaptive Reduction of Coding Artifacts for MPEG Video Signals", pp. 928-932, IEEE, 1994.

* cited by examiner

FIG.5 post filter simulation results

| condition | sequence | QP | bits | PSNR_Y | | | | | | | |
|---|---|---|---|---|---|---|---|---|---|---|---|
| | | | | VM Only | Telenor Deblocking | PSL Deblocking | NS Deblocking | SEC Deblocking | SEC Deblocking | LGS Deblocking | LGS+SEC Deblocking |
| 10Kps | Hall monitor | 17 | 96583 | 30.04 | 30.22 | 30.14 | 30.10 | 30.30 | 30.20 | 30.37 | 30.43 |
| QCIF | Container ship | 17 | 93556 | 29.21 | 29.29 | 29.05 | 29.24 | 29.38 | 29.34 | 29.43 | 29.50 |
| 7.5Hz | Mother & daughter | 15 | 95579 | 32.32 | 32.43 | 32.35 | 32.30 | 32.31 | 32.44 | 32.49 | 32.48 |
| 24Kbps | Hall monitor | 9 | 236220 | 33.82 | 34.03 | 33.85 | 33.90 | 34.09 | 34.00 | 34.20 | 34.24 |
| QCIF | Container ship | 10 | 217480 | 32.36 | 32.44 | 32.08 | 32.36 | 32.50 | 32.49 | 32.54 | 32.61 |
| 10Hz | Mother & daughter | 8 | 231791 | 35.20 | 35.31 | 35.19 | 35.07 | 35.23 | 35.25 | 35.36 | 35.31 |
| 48Kbps | Foreman | 13 | 478108 | 30.91 | 30.97 | 30.89 | 30.87 | 30.95 | 31.00 | 31.06 | 31.07 |
| QCIF | Coast guard | 14 | 446028 | 29.01 | 28.99 | 28.54 | 28.97 | 28.98 | 28.92 | 29.09 | 28.93 |
| 10Hz | Mother & daughter | 7 | 484656 | 34.30 | 34.45 | 34.28 | 34.11 | 34.34 | 34.36 | 34.48 | 34.48 |
| 48Kbps | News | 18 | 472973 | 31.20 | 31.32 | 31.19 | 31.21 | 31.33 | 31.31 | 31.40 | 31.40 |
| CIF | Container ship | 10 | 468027 | 36.06 | 36.22 | 36.07 | 35.93 | 36.08 | 36.13 | 36.18 | 36.08 |
| 7.5Hz | Hall monitor | 12 | 458066 | 33.59 | 33.81 | 33.82 | 33.64 | 33.89 | 33.74 | 34.02 | 34.02 |
| 112Kbps | News | 11 | 1139868 | 34.00 | 34.13 | 34.06 | 33.97 | 34.17 | 34.13 | 34.26 | 34.29 |
| CIF | Foreman | 30 | 1184538 | 28.25 | 28.33 | 28.09 | 28.24 | 28.23 | 28.32 | 28.35 | 28.37 |
| 15Hz | Coast guard | 29 | 1172406 | 26.36 | 26.35 | 25.95 | 26.34 | 26.31 | 26.28 | 26.42 | 26.28 |
| 1Mbps | Stefan | 13 | 9796735 | 29.00 | 29.02 | 28.31 | 28.97 | 29.05 | 29.05 | 29.12 | 29.13 |
| SIF,30Hz | Mobile & Calendar | 14 | 10259224 | 26.25 | 26.21 | 25.61 | 25.68 | 26.30 | 26.30 | 26.29 | 26.33 |

METHOD OF REMOVING BLOCKING ARTIFACTS IN A CODING SYSTEM OF A MOVING PICTURE

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,240,135. The reissue applications are application Ser. Nos. 11/834,312; 11/834,347; 11/851,551; 11/851,529; and 11/851,517, all of which are divisional reissues of U.S. Pat. No. 6,240,135. The present application is a continuation of reissue application Ser. No. 11/834,312, filed Aug. 6, 2007 now U.S. Pat. No. Re. 42,851, which is a divisional reissue application of U.S. Pat. No. 6,240,135.*

BACKGROUND OF THE INVENTION

1. Field of the Invention

The present invention relates to a method of coding data, and more particularly, to a method of removing blocking artifacts when coding image signals such as in a moving picture at low-bit-rate.

2. Background of the Related Art

Generally, to efficiently compress a time variable video sequence, it is necessary to remove redundancy in the temporal domain as well as in the two-dimensional spatial domain. In moving picture experts group (MPEG), discrete cosine transform (DCT) is used to remove the redundancy in the two-dimensional spatial domain while a motion compensation method is used to remove the redundancy in the temporal domain.

The DCT is a method of removing the correlativity between data through a two-dimensional spatial transformation. Each block in a picture is spatially transformed using the DCT after the picture is divided into blocks. Data that has been spatially transformed tends to be driven to a certain direction. Only a group of the data driven in the certain direction is quantized and transmitted.

Pictures, which are consecutive in the temporal domain, tend to form motions of a human being or an object at the center of the frame. This property is used to reduce the redundancy of the temporal domain in the motion compensation method. A volume of data to be transmitted can be minimized by taking out a similar region from the preceding picture to fill a corresponding region, which has not been changed (or has very little change), in the present picture. The operation of finding the most similar blocks between pictures is called a motion estimation. The displacement representing a degree of motion is called a motion vector. MPEG uses a motion compensation-DCT method so that the two methods combine.

When a compression technique is combined with a DCT algorithm, the DCT transform is usually performed after input data is sampled in a unit size of 8×8, and the transform coefficients are quantized with respect to a visual property using quantization values from a quantization table. Then, the data is compressed through a run length coding (RLC). The data processed with the DCT is converted from a spatial domain to a frequency domain and compressed through the quantization with respect to the visual property of human beings, not to be visually recognized. For example, since eyes of human beings are insensitive to a high frequency, a high frequency coefficient is quantized in a large step size.

For the quantized data, the data having a relatively high frequency is coded with a short code word. The quantized data having a low frequency is coded with a long code word. Thus, the data is finally compressed.

In processing a moving picture as discussed above, blocks are individually processed to maximize the compression ratio and coding efficiency. However, the individual process causes blocking artifacts that disturb the eyes of human beings at boundaries between blocks.

A related art method of removing blocking artifacts will be described with reference to FIGS. 1 and 2. FIG. 1 is a pixel matrix illustrating a method for removing blocking artifacts. FIG. 2 is a pixel matrix illustrating block boundaries in horizontal and vertical directions.

Various algorithms have been presented for removing blocking artifacts that appear in a coding system, which individually processes blocks. For example, MPEG-4 used a deblocking filter by Telenor, which uses the following algorithm:

If B is replaced with B1 and C is replaced with C1, $B1=B+d1$, $C1=C-d1$, and $d1=\mathrm{sign}(d)*(\mathrm{MAX}(0,|d|-\mathrm{MAX}(0,2*|d|-QP)))$ where $d=(3A-8B+8C-3D)/16$ and QP denotes the quantization parameter of the macroblock where pixel C belongs.

In processing a MPEG-4 moving picture, blocking artifacts are removed using the above algorithm to improve picture quality. However, it is difficult to effectively remove the blocking artifacts with the above with a small operation capacity in a real time operation. For example, coding and decoding a moving picture is a real time operation. In other words, to completely remove the blocking artifacts, a large calculation amount is needed, which is undesirable in efficiency.

Alternatively, to remove the blocking artifacts, there is provided a method of changing processes of coding and decoding. This method increases the amount of bits to be transmitted.

Still another method for removing blocking artifacts is based on the theory of projection onto convex sets (POCS). However, this method is applied only to a still picture because of an iteration structure and long convergence time.

Thus, the related art methods for removing blocking artifacts in a coding system of a moving picture have several problems. First, in performing an algorithm for removing the blocking artifacts, a calculation is complicated and the calculation amount and time become correspondingly large. Further, the blocking artifacts are not removed in either complex regions or smooth regions in a picture. In addition, the amount of bits to be transmitted increases.

SUMMARY OF THE INVENTION

An object of the present invention is to provide a method of removing blocking artifacts in a coding system that substantially obviates one or more of the problems due to limitations and disadvantages of the related art.

Another object of the present invention is to remove blocking artifacts when necessary in a smooth portion of a moving picture.

Yet another object of the present invention is to provide a method of removing blocking artifacts in a coding system of a moving picture where blocking artifacts of the moving picture are removed at real time using frequency features around a block boundary without increasing the amount of bits.

To achieve at least the above objects in a whole or in parts, a method of removing blocking artifacts in a coding system according to the present invention includes determining at least pixel sets S0, S1, S2 around a block boundary, selecting one of a default mode and a DC offset mode as a deblocking mode based on an amount of blocking artifacts, deblocking filtering pixels adjacent the block boundary if a default mode is selected, deblocking filtering of pixels adjacent the block boundary if a default mode is selected, and removing artifacts in the DC offset mode when the DC offset mode is selected and a DC offset mode condition is satisfied, where the artifacts are removed in the DC offset mode according to the following equation:

$$v_n = \sum_{k=-4}^{4} b_k \cdot p_{n+k},\ 1 \le n \le 8$$

$$P_m = (|v_1 - v_0| < QP)?v_0 : v_1,$$

If m<1;

$v_m$, if $1 \le m \le 8$;

$(|v_8 - v_9| < QP)\ v_9 : v_8$, if m>8;

$\{b_k : -4 \le k \le 4\} = \{1,1,2,2,4,2,2,1,1\}//16$, wherein $v_0$–$v_9$ are boundary pixels, QP is the quantitation parameter of a block adjacent the block boundary, and $v_m$ is an adjusted pixel value.

To further achieve the above advantages and in accordance with the purpose of the present invention, as embodied and broadly described, a method of removing blocking artifacts in a coding system of a moving picture according to the present invention includes the steps of defining pixel sets S0, S1, S2 around block boundary, selectively determining a deblocking mode as a default mode or a DC offset mode depending on the degree of blocking artifacts after obtaining a mode decision value, obtaining frequency information around the block boundary per pixel using 4-point DCT kernel if the default mode is determined, replacing a magnitude of a discontinuous component belonging to the block boundary with a minimum magnitude of discontinuous components belonging to the surroundings of the block boundary in the frequency domain and applying this replacing step to the spatial domain, judging whether or not it is necessary to perform DC offset mode if the DC offset mode is determined, and removing the blocking artifacts in a smooth region when the judgment is to perform the DC offset mode.

BRIEF DESCRIPTION OF THE DRAWINGS

The invention will be described in detail with reference to the following drawings in which like reference numerals refer to like elements wherein:

FIG. 5 is a table showing exemplary results of a preferred embodiment of a method of removing blocking artifacts according to the present invention.

DETAILED DESCRIPTION OF PREFERRED EMBODIMENTS

In a preferred embodiment of the present invention, blocking artifacts at a block boundary are removed in a frequency domain not a spatial domain. Frequency features around the block boundary are preferably obtained using a 4-point DCT kernel, which can be easily calculated. Thus, a complex region at the block boundary can effectively be processed by extending the smoothness of a picture from the frequency domain to the spatial domain.

Using the 4-point DCT kernel has advantages that frequency analysis is possible and deblocking can easily be processed. Therefore, the 4-point DCT Kernel can efficiently remove the blocking artifacts of a real time moving picture.

The blocking artifacts appear at the block boundary between fixed block patterns in the form of a line of discontinuity. Accordingly, removal of the blocking artifacts involves transformation of the discontinuity of the block boundary region to continuity.

Figure 1:
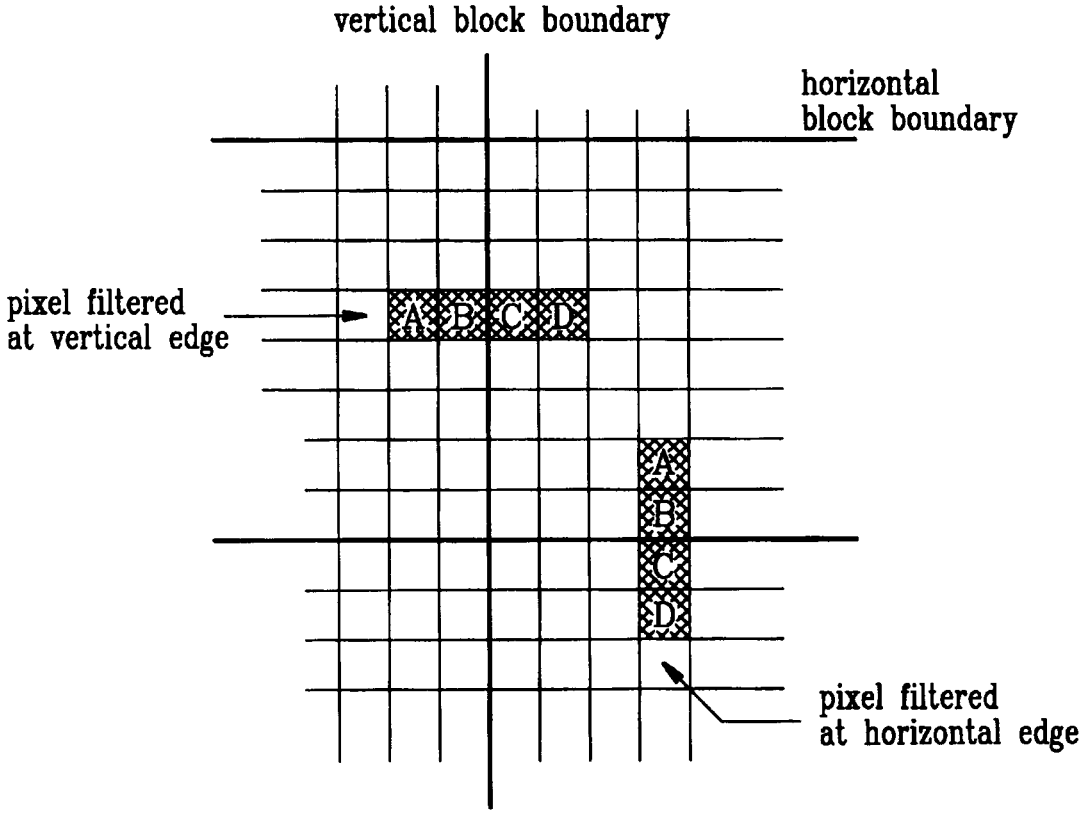
FIG. 1 Prior art
FIG. 1 is a diagram showing a pixel matrix illustrating a related art method of removing blocking artifacts.
Figure 2:
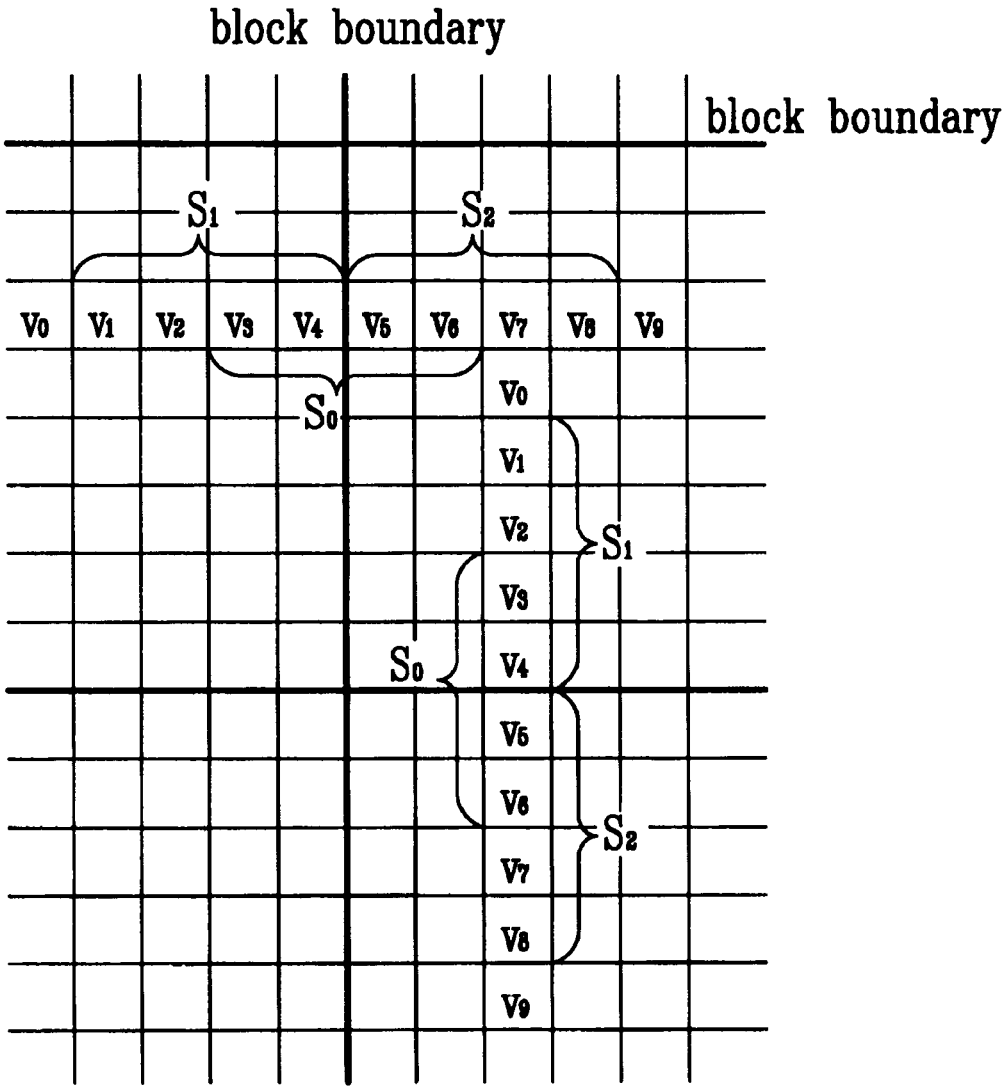
FIG. 2 is a diagram showing a pixel matrix illustrating block boundaries in horizontal and vertical directions.

FIG. 2 shows a block boundary region in a horizontal or a vertical direction. In one-dimensional images consisting of four pooints such as S0, S1 and S2 located around the block boundary, S1 and S2 are individually processed with a block-unit compression method. Thus, S1 and S2 are not influenced by the blocking artifacts. However, S0 is located across a block boundary. Thus, S0 is directly influenced by the blocking artifacts.

In the preferred embodiment according to the present invention, frequency information in S1 and S2 is used to reduce the blocking artifacts from S0. When images change smoothly, image features of S0, S1 and S2 are similar to one another. This means that image features of S0, S1 and S2 are also similar to one another in the frequency domain.

Since the frequency features of S0, S1 and S2 are similar, the frequency component of S0 influenced by the blocking artifacts is adjusted considering the frequency components of S1, S2, which can remove the blocking artifacts. Here, DCT, which is widely applied as an image compression technique, is used as a frequency analysis tool.

The blocking artifacts may appear in both horizontal and vertical block boundaries. In the preferred embodiment according to the present invention, after the blocking artifacts at the horizontal block boundary are removed, the blocking artifacts at the vertical block boundary are removed.

Pixel sets S0, S1 and S2, which overlap, can be defined around the horizontal block boundary. S0 is a 4-point pixel set arranged across the block boundary while S1 and S2 are 4-point pixel sets that adjoin the block boundary.

That is to say, the pixel set S0 contains a discontinuity. The discontinuity in S0 is removed in the preferred embodiment using common information (e.g., between S0 and S2), which are not directly influenced by the discontinuity of the block boundary.

Figure 3:
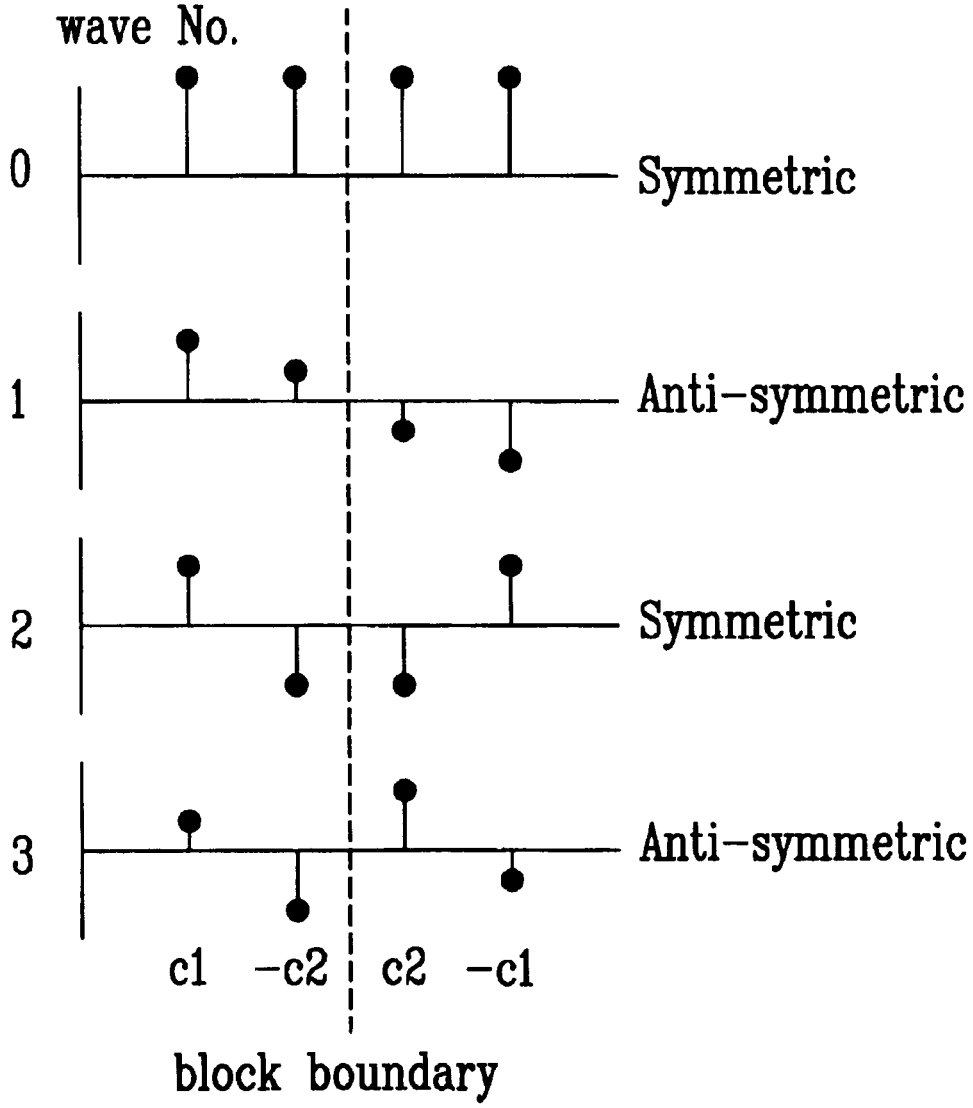
FIG. 3 is a schematic diagram showing a 4-point DCT basis.

The 4-point DCT basis is used to get information around the block boundary and is shown in FIG. 3. The 4-point DCT basis vectors have symmetric and anti-symmetric properties. In other words, assuming the 4-point DCT coefficients of S0 are defined as $a_{0,0}$(DC), $a_{1,0}$, $a_{2,0}$, $a_{3,0}$, although both $a_{2,0}$ and $a_{3,0}$ are the high frequency components, $a_{2,0}$ is symmetric and $a_{3,0}$ is anti-symmetric around the center.

As shown in FIG. 2, since the center of S0 is coincident with the block boundary, a factor directly affecting the block discontinuity is not the symmetric component but the anti-symmetric component. Thus, in the preferred embodiment the magnitude of $a_{3,0}$ in the frequency domain is adjusted based on the anti-symmetric component so that the block discontinuity can be adjusted. An appropriate adjustment of $a_{3,0}$ in the frequency domain is directly related to the removal of the block discontinuity in the spatial domain.

Operations for reduction or removal of the block discontinuity will now be described. In the preferred embodiment, the magnitude of $a_{3,0}$ is replaced with the minimum value of the magnitudes of $a_{3,1}$ and $a_{3,2}$. By doing this, a large blocking artifact, which appears when one side of the block boundary to be processed is smooth, can be removed. For a complex region where both S1 and S2 are the objects of motion (i.e., all the values of the magnitudes of $a_{3,0}$, $a_{3,1}$ and $a_{3,2}$ are large), there is little influence on the block boundary.

A method for removing the blocking artifacts in a default mode in the preferred embodiment is as follows:

$v_4'=v_4-d$;

$v_5'=v_5+d$; and $d=CLIP(c_2.(a_{3,0}'-a_{3,0})//c_3,0,(v_4-v_5)/2)*\delta(|a_{3,0}|<QP)$, where $a_{3,0}'=SIGN(a_{3,0})*MIN(|a_{3,0}|,|a_{3,1}|,|a_{3,2}|)$, $a_{3,0}=([c_1-c_2\ c_2-c_1]*[v_3v_4v_5v_6]^T)//c_3$, $a_{3,1}=([c_1-c_2\ c_2-c_1]*[v_1v_2v_3v_4]^T)//c_3$, and $a_{3,2}=([c_1-c_2\ c_2-c_1]*[v_5v_6v_7v_8]^T)//c_3$.

Thus, boundary pixels $v_4$ and $v_5$ that adjoin the boundary are replaced with $v_4'$ and $v_5'$, respectively. QP is the quantization parameter of the macroblock where pixel $v_5$ belongs. Values $c_1$, $c_2$, $c_3$ are kernel constants used in the 4-point DCT. The values of $c_1$ and $c_2$ are approximated to an integer, and the value of $c_3$ is approximated to a multiple of 2. The values of $a_{3,0}$, $a_{3,1}$, $a_{3,2}$ are evaluated from the simple inner product of the DCT kernel and the pixel sets S0, S 1 and S2.

The condition $|a_{3,0}|<QP$ is used to count the influence of the quantization parameter on the blocking artifacts. The condition $|a_{3,0}|<QP$ also prevents over-smoothing when the blocking artifacts are not very serious. The clipping operation on the compensated value is performed to prevent the direction of the gradient at the block boundary from being enlarged or changed in an opposite direction.

This filtering process is performed in both horizontal and vertical block boundaries. In this manner, the blocking artifacts in the whole frame can be removed.

In the default mode, only the boundary pixel values $v_4$ and $v_5$ are compensated. Thus, the default mode is not sufficient to remove the blocking artifacts in a very smooth region, such as a setting in a picture. Therefore, in the preferred embodiment the blocking artifacts in the smooth region are removed by a DC offset mode.

A method for removing the blocking artifacts in the DC offset mode in the preferred embodiment is as follows:

$max=MAX(v_1, v_2, v_3, v_4, v_5, v_6, v_7, v_8)$, $min=MIN(v_1, v_2, v_3, v_4, v_5, v_6, v_7, v_8)$, if($|max-min|<2QP$), /*low pass filtering*/

$$v_n = \sum_{k=-4}^{4} b_k \cdot p_{n+k},\ 1 \le n \le 8$$

$$P_m=(|v_1-v_0|<QP)?v_0:v_1,$$

if $m<1$;

$v_m$, if $1\le m\le 8$;

$(|v_8-v_9|<QP)\ v_9:v_8$, if $m>8$;

$\{b_k:-4\le k\le 4\}=\{1,1,2,2,4,2,2,1,1\}//16$.

If the absolute value of the maximum data value minus minimum data value in the block boundary pixels is smaller than twice the quantization parameter (i.e., if deblocking is required), the blocking artifacts in the smooth region are removed by the DC offset mode.

The decision to use the default mode or to use the DC offset mode is preferably made based on the following condition:

$$\text{Mode decision value(eq_cnt)}-\phi(v_0-v_1)+\phi(v_1-v_2)+\phi(v_2-v_3)+\phi(v_3-v_4)+\phi(v_4-v_5)+\phi(v_5-v_1)+\phi(v_7-v_8)+\phi(v_8-v_9),$$

where $\phi(\gamma)=1$ if $|\gamma|\le THR1$ (first threshold value) and $\phi(\gamma)=0$ otherwise.

If the mode decision value eq_cnt≥THR2(i.e., a second threshold value), the DC offset mode is applied. In the remaining cases, default mode is applied.

Figure 4:
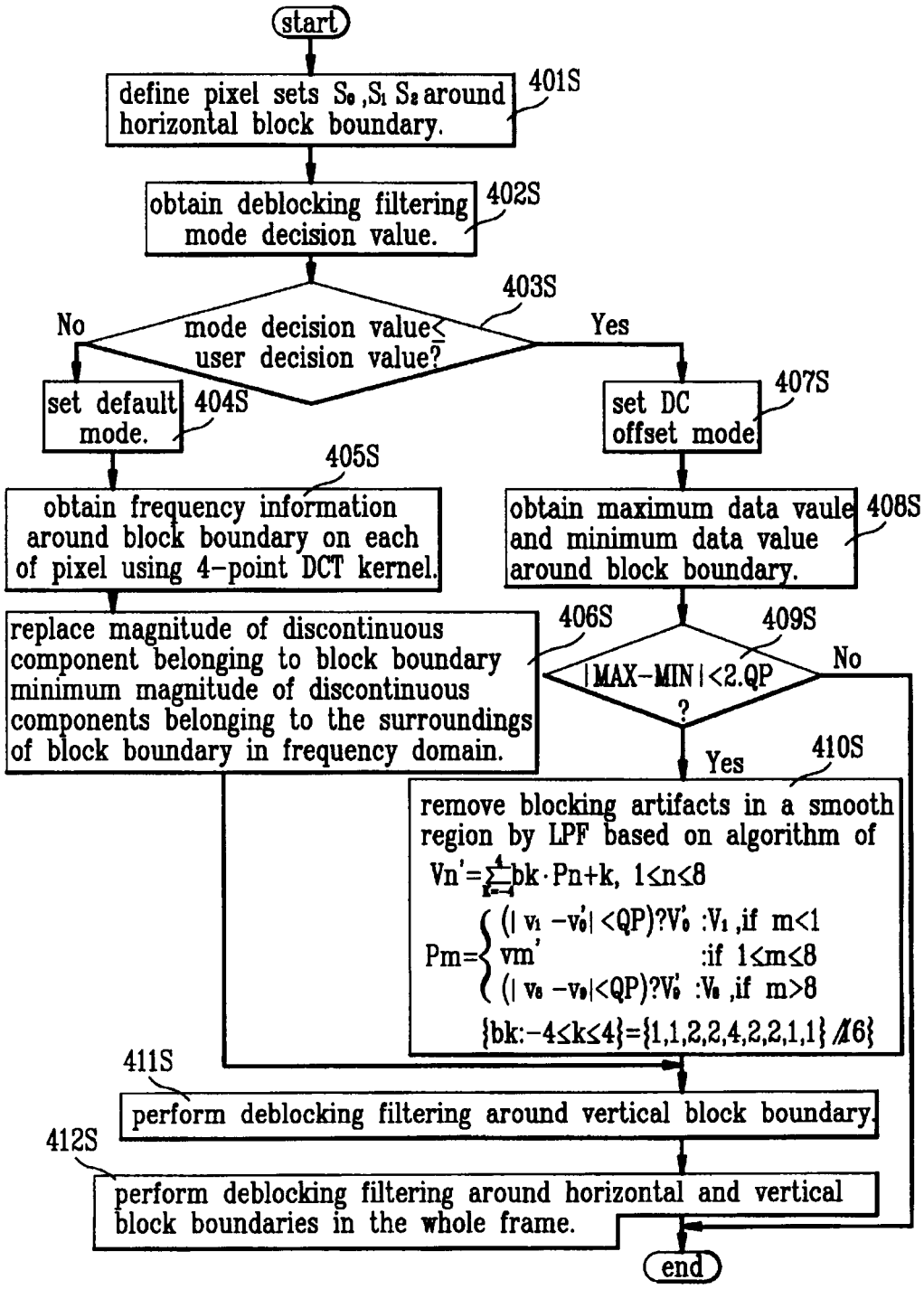
FIG. 4 is a flow chart showing a preferred embodiment of a method of removing blocking artifacts according to the present invention.

A method for removing the blocking artifacts to code a moving picture at low-rate-bit according to the preferred embodiment of the present invention will be described with reference to FIG. 4. After beginning in FIG. 4, control continues to step 401S. In step 401S, three pixel sets S0, S1, S2 are defined based on the horizontal block boundary. From step 401S, control continues to step 402S.

In step 402S, the mode decision value (e.g., eq_cnt) is determined and control continues to step 403S. In step 403S, the mode decision value is compared with a decision value (e.g., a second threshold value THR2 preferably set by a user) to perform deblocking filtering process by selecting the mode depending on the degree of the blocking artifacts in the picture.

If the determination in step 403S is negative, control continues to step 404S where the default mode is set. From step 404S, control continues to step 405S where frequency information around the block boundary on each of the pixel is determined, for example, using the 4-point DCT kernel. From step 405S, control continues to step 406S.

In step 406S, the magnitude of the discontinuous component belonging to the block boundary is replaced with the minimum magnitude of the discontinuous components belonging to the surroundings of the block boundary in the frequency domain. This adjusting operation is applied to the spatial domain. That is, the magnitude of the discontinuous component belonging to the block boundary is replaced with the minimum magnitude of the discontinuous components belonging to the surroundings of the block boundary in the spatial domain.

In the default mode of the preferred embodiment, the blocking artifacts are removed in step 406S using the method as described below:

$v_4'=v_4-d$;

$v_5'=v_5+d$; and $d=CLIP(c_2.(a_{3,0}'-a_{3,0})//c_3,0,(v_4-v_5)/2)*\delta(|a_3|<QP)$, where $a_{3,0}'=SIGN(a_{3,0})*MIN(|a_{3,0}|,|a_{3,1}|,|a_{3,2}|)$, $a_{3,0}=([c_1-c_2\ c_2-c_1]*[v_3v_4v_5v_6]^T)//c_3$, $a_{3,1}=([c_1-c_2\ c_2-c_1]*[v_1v_2v_3v_4]^T)//c_3$, $a_{3,2}=([c_1-c_2\ c_2-c_1]*[v_5v_6v_7v_8]^T)//c_3$. In the default mode, the blocking artifacts are effectively removed in a complex region. However, the default mode does not sufficiently remove blocking artifacts in a smooth region.

If the determination in step 403S is affirmative, control continues to step 407S where the DC offset mode is set to remove the blocking artifacts. From step 407S, control continues to step 408S where the minimum and maximum data values (min, max) are determined. From step 408S, control continues to step 409S where a determination is made to remove the blocking artifacts in the default mode. If the determination in step 409S is negative, the process ends. If the determination in step 409S is affirmative, control continues to step 410S.

In the DC offset mode according to the preferred embodiment, in step 410S, the blocking artifacts are removed using the following algorithm.

max=MAX($v_1$, $v_2$, $v_3$, $v_4$, $v_5$, $v_6$, $v_7$, $v_8$), min=MIN($v_1$, $v_2$, $v_3$, $v_4$, $v_5$, $v_6$, $v_7$, $v_8$), if(|max−min|<2QP), /*low pass filtering*/

$$v_n = \sum_{k=-4}^{4} b_k \cdot p_{n+k},\ 1 \le n \le 8$$

$$P_m=(|v_1-v_0|<QP)?v_0:v_1,$$

if m<1;

$v_m$, if 1≤m≤8;

($|v_8-v_9|$<QP) $v'_9$:$v_8$, if m>8;

$\{b_k: -4 \le k \le 4\}=\{1,1,2,2,4,2,2,1,1\}//16$.

The maximum data value and the minimum data value in the block boundary pixels are obtained in step 408S. Then, if the absolute value of the maximum data value minus the minimum data value is smaller than 2QP (i.e., if deblocking is required), the blocking artifacts in the smooth region are removed by the DC offset mode in steps 409S and 410S.

From step 406S and 410S, control continues to step 411S. If the deblocking filtering process around the horizontal block boundary is completed, the deblocking filtering process around the vertical block boundary is performed in step 411S. From step 411S, control continues to step 412S.

In step 412S, the deblocking filtering processes around the horizontal and vertical block boundaries repeat over the whole frame. From step 412S, the process ends.

FIG. 5 is a table illustrating exemplary PSNR properties according to the method of removing the blocking artifacts of the preferred embodiment. The conditions yielding the exemplary results of FIG. 5 are as follows:

300 frames (only the initial frame was coded in intra.);

Fixed QP;

H.263 quantization;

F_code=1;

Enable DC/AC prediction; and

Rectangular shape VOP.

As shown in FIG. 5, the method for removing the blocking artifacts of the preferred embodiment improves results relative to VM (no filtering) of MPEG-4.

As described above, the method for removing the blocking artifacts according to the preferred embodiments of the present invention has various advantages. The deblocking filtering process is performed using features of the frequency domain so that the blocking artifacts are effectively removed. Further, the blocking artifacts are removed in both the complex and smooth regions. Thus, an excellent image or picture quality is provided. In addition, amount of bits does not increase.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

[1. A method for removing blocking artifacts in a coding system of a moving picture comprising the steps of:

determining a plurality of pixel sets around a block boundary;

selecting one of a first mode and a second mode as a deblocking mode based on a degree of blocking artifacts;

performing an analysis, if the first mode is selected, comprising, obtaining frequency information for each of the plurality of pixel sets, replacing a magnitude of at least one discontinuous component in the frequency domain of a selected pixel set of the plurality of pixel sets belonging to the block boundary with a magnitude of at least one corresponding discontinuous component belonging to a replacement pixel set of the plurality of pixel sets near the block boundary, and applying the replaced frequency information of the selected pixel set to the spatial domain to remove the blocking artifacts; and removing the blocking artifacts in the second mode, if the second mode is selected and a second mode condition is satisfied.]

[2. The method as claimed in claim 1, wherein the magnitude of the discontinuous component of the selected pixel set is replaced with a minimum value of a magnitude of discontinuous components of one of a first pixel set and a second pixel set when the selected pixel set is located across the block boundary and the first and second pixel sets are located within a block adjacent the block boundary.]

[3. The method of claim 1, further comprising determining a mode decision value, wherein the second mode is selected if the mode decision value is greater than a first threshold value.]

[4. The method as claimed in claim 3, wherein mode decision value is determined based on the following equation:

$$\text{mode decision value}=\phi(v_0-v_1)+\phi(v_1-v_2)+\phi(v_2-v_3)+\phi(v_3-v_4)+\phi(v_4-v_5)+\phi(v_5-v_1)+\phi(v_7-v_8)+\phi(v_8-v_9),$$

wherein $\phi(\gamma)=1$ when $|\gamma| \le$ a second threshold value and $\phi(\gamma)=0$ otherwise, and wherein $v_0$−$v_9$ are boundary pixel values.]

[5. The method as claimed in claim 1, wherein the second mode condition is satisfied when an absolute value of a maximum data value minus a minimum data value in block boundary pixels is smaller than 2QP, wherein the maximum data value=MAX($v_1$, $v_2$, $v_3$, $v_4$, $v_5$, $v_6$, $v_7$, $v_8$), the minimum data value=MIN($v_1$, $v_2$, $v_3$, $v_4$, $v_5$, $v_6$, $v_7$, $v_8$), QP is the quantization parameter of a block adjacent the block boundary and $v_1$−$v_8$ are pixels.]

[6. The method as claimed in claim 1, wherein the second mode performs low pass filtering to remove the blocking artifacts.]

[7. The method as claimed in claim 1, wherein the deblocking filtering in the default mode is performed by replacing the magnitude of the discontinuous component of pixels $v_4$ and $v_5$ that sandwich the block boundary with $v_4'$ and $v_5'$, according to the following equation:

$v_4'=v_4-d$ $v_5'=v_5+d$ $d=CLIP(c_2.(a_{3,0}'-a_{3,0})//c_3,0,(v_4-v_5)/2)*\delta(|a_{3,0}|<QP)$ $a_{3,0}'=SIGN(a_{3,0})*MIN(|a_{3,0}|,|a_{3,1}|,|a_{3,2}|)$ $a_{3,0}=([c_1-c_2\ c_2-c_1]*[v_3v_4v_5v_6]^T)//c_3$ $a_{3,1}=([c_1-c_2\ c_2-c_1]*[v_1v_2v_3v_4]^T)//c_3$ $a_{3,2}=([c_1-c_2\ c_2-c_1]*[v_5v_6v_7v_8]^T)//c_3$, where QP is the quantization parameter of the block containing the pixel $v_5$, values $c_1$, $c_2$, $c_3$ are kernel constants used in a DCT, and values of $a_{3,0}$, $a_{3,1}$, $a_{3,2}$ are the discontinuous component in each of the plurality of pixel sets, respectively.]

[8. The method as claimed in claim 7, wherein $c_1$ and $c_2$ are approximated to an integer and $c_3$ is approximated to a multiple of 2, wherein the DCT is a 4-point DCT used to determine the frequency information, and wherein $a_{3,0}$, $a_{3,1}$, $a_{3,2}$ are evaluated from an inner product of the DCT kernel and the selected pixel set being S0, a first pixel set S1 and a second pixel set S2. ]

[9. The method as claimed in claim 7, wherein $|a_{3,0}|<QP$ prevents over-smoothing.]

[10. The method as claimed in claim 1, further comprising performing the deblocking filtering process around horizontal and vertical block boundaries in a frame.]

[11. The method of claim 1, wherein the removing blocking artifacts in the second mode satisfies the following equation:

$$v_n = \sum_{k=-4}^{4} b_k \cdot p_{n+k},\ 1 \le n \le 8$$

$$P_m=(|v_1-v_0<QP)?v_0:v_1,$$

if m<1;

$v_m$, if $1 \le m \le 8$;

$(|v_8-v_9|<QP)\ v_9:v_8$, if m>8;

$\{b_k:-4 \le k \le 4\}=\{1,1,2,2,4,2,2,1,1\}//16$, where $v_0-v_9$ are boundary pixels, QP is the quantization parameter of a block adjacent the block boundary, and $v_m$ is an adjusted pixel value.]

[12. The method of claim 1, wherein the replacement pixel set contains a minimum magnitude of the at least one corresponding discontinuous component.]

[13. The method of claim 1, wherein the first mode is the default mode and the second mode is the DC offset mode, and wherein each of the plurality of pixel sets has four pixels.]

[14. A method for removing blocking artifacts in a coding system comprising:

determining at least pixel sets S0, Sl, S2 around a block boundary;

selecting one of a default mode and a DC offset mode as a deblocking mode based on an amount of blocking artifacts;

deblocking filtering of pixels adjacent the block boundary if the default mode is selected; and removing artifacts in the DC offset mode, if the DC offset mode is selected and a DC offset mode condition is satisfied, wherein the artifacts are removed in the DC offset mode according to the following equation:

$$v_n = \sum_{k=-4}^{4} b_k \cdot p_{n+k},\ 1 \le n \le 8$$

$$P_m=(|v_1-v_0|<QP)?v_0:v_1,$$

if m<1;

$v_m$, if $1 \le m \le 8$;

$(|v_8-v_9|<QP)\ v_9:v_8$, if m>8;

$\{b_k:-4 \le k \le 4\}=\{1,1,2,2,4,2,2,1,1\}//16$, wherein $v_0-v_9$ are boundary pixels, QP is the quanatation parameter of a block adjacent the block boundary, and $v_n$ is an adjusted pixel value.]

[15. The method of claim 14, wherein the deblocking filtering step comprises:

obtaining frequency information for each of the plurality of pixel sets S0, S1, S2;

replacing a magnitude of at least one discontinuous component in the frequency domain of a selected pixel set S0 of the plurality of pixel sets belonging to the block boundary with a magnitude of at least one corresponding discontinuous component belonging to a replacement pixel set S1, S2 of the plurality of pixel sets near the block boundary; and applying the replaced frequency information of the selected pixel set S0 to the spatial domain to remove the blocking artifacts.]

[16. The method of claim 14, further comprising determining a mode decision value, wherein the DC offset mode is selected if the mode decision value is greater than a first threshold value, wherein mode decision value is determined based on the following equation:

$$\text{mode decision value}=\phi(v_0-v_1)+\phi(v_1-v_2)+\phi(v_2-v_3)+\phi(v_3-v_4)+\phi(v_4-v_5)+\phi(v5-v_1)+\phi(v_7-v_8)+\phi(v_8-v_9),$$

wherein $\phi(\gamma)=1$ when $|\gamma| \le$ a second threshold value and $\phi(\gamma)=0$ otherwise, and wherein $v_0-v_9$ are boundary pixel values.]

[17. The method of claim 14, wherein the DC offset mode condition is satisfied when an absolute value of a maximum data value minus a minimum data value in block boundary pixels is smaller than 2QP, wherein the maximum data value=MAX($v_1$, $v_2$, $v_3$, $v_4$, $v_5$, $v_6$, $v_7$, $v_8$), the minimum data value=MIN($v_1$, $v_2$, $v_3$, $v_4$, $v_5$, $v_6$, $v_7$, $v_8$), QP is the quantization parameter of a block adjacent the block boundary and $v_1-v_8$ are the block boundary pixels.]

[18. The method of claim 14, wherein the deblocking filtering in the default mode is performed by replacing the magnitude of the discontinuous component of pixels $v_4$ and $v_5$ sandwiching the block boundary with $v_4'$ and $v_5'$, according to the following equation:

$v_4'=v_4-d$ $v_5'=v_5+d$ $d=CLIP(c_2.(a_{3,0}'-a_{3,0})//c_3,0,(v_4-v_5)/2)*\delta(|a_{3,0}|<QP)$ $a_{3,0}'=SIGN(a_{3,0})*MIN(|a_{3,0}|,|a_{3,1}|,|a_{3,2}|)$ $a_{3,0}=([c_1-c_2\ c_2-c_1]*[v_3v_4v_5v_6]^T)//c_3$ $a_{3,1}=([c_1-c_2\ c_2-c_1]*[v_1v_2v_3v_4]^T)//c_3$ $a_{3,2}=([c_1-c_2\ c_2-c_1]*[v_5v_6v_7v_8]^T)//c_3$, where QP is the quantization parameter of the block containing the pixel $v_5$, values $c_1$, $c_2$, $c_3$ are kernel constants used in a 4-point DCT, and values $a_{3,0}$, $a_{3,1}$,$a_{3,2}$ are based on a simple inner product of the DCT kernel and the selected pixel set S0, a first pixel set S1 and the second pixel set S2. ]

[19. The method of claim 14, further comprising performing the determining through removing steps for each horizontal and vertical block boundaries in a frame.]

*20. A method for removing blocking artifacts in a coding system of a moving picture, the method comprising:*

*determining a plurality of pixel sets around a block boundary;*

*selecting one of a first mode and a second mode as a deblockinq mode based on a degree of blocking artifacts;*

*performing an analysis, if the first mode is selected, the analysis including,*

*obtaining frequency information for each of the plurality of pixel sets,*

*replacing a magnitude of at least one discontinuous component in the frequency domain of a selected pixel set of the plurality of pixel sets belonging to the block* boundary with a magnitude of at least one corresponding discontinuous component belonging to a replacement pixel set of the plurality of pixel sets near the block boundary if the magnitude of the at least one discontinuous component is less than a quantization parameter, and applying the replaced frequency information of the selected pixel set to the spatial domain to remove the blocking artifacts; and removing the blocking artifacts in the second mode, if the second mode is selected and a second mode condition is satisfied.

21. The method of claim 20, wherein the magnitude of the discontinuous component of the selected pixel set is replaced with a minimum value of a magnitude of discontinuous components of one of a first pixel set and a second pixel set when the selected pixel set is located across the block boundary and the first and second pixel sets are located within a block adjacent the block boundary.

22. The method of claim 20, further comprising determining a mode decision value, wherein the second mode is selected if the mode decision value is greater than a first threshold value.

23. The method of claim 22, wherein mode decision value is determined based on the following equation:

$$\text{mode decision value}=\phi(v_0-v_1)+\phi(v_1-v_2)+\phi(v_2-v_3)+\phi(v_3-v_4)+\phi(v_4-v_5)+\phi(v_5-v_1)+\phi(v_7-v_8)+\phi(v_8-v_9),$$

wherein $\phi(\gamma)=1$ when $|\gamma|\leq$ a second threshold value and $\phi(\gamma)=0$ otherwise, wherein $v_0-v_9$ are boundary pixel values, and wherein $\phi(\gamma)$ is a function generating 1 or 0 according to $|\gamma|$ and $\gamma$ is a variable denoting a result of substraction of two given boundary pixel values.

24. The method of claim 20, wherein:

the second mode condition is satisfied when an absolute value of a maximum data value minus a minimum data value in block boundary pixels is smaller than 2QP; and the maximium data value=$MAX(v_1, v_2, v_3, v_4, v_5, v_6, v_7, v_8)$, the minimum data value=$MIN(v_1, v_2, v_3, v_4, v_5, v_6, v_7, v_8)$, QP is the quantization parameter of a block adjacent the block boundary and $v_1-v_8$ are pixels.

25. The method of claim 20, wherein the second mode performs low pass filtering to remove the blocking artifacts.

26. The method of claim 20, wherein the deblocking filtering in the default mode is performed by replacing the magnitude of the discountinuous component of pixels $v_4$ and $v_5$ that sandwich the block boundary with $v_4'$ and $v_5'$, according to the following equation:

$$v_4'=v_4-d$$

$$v_5'=v_5+d$$

$$d=CLIP(c_2\cdot(a_{3,0}'-a_{3,0})//c_3,0,(v_4-v_5)/2)*\delta(|a_{3,0}|<QP)$$

$$a_{3,0}'=SIGN(a_{3,0})*MIN(|a_{3,0}|,|a_{3,1}|,|a_{3,2}|)$$

$$a_{3,0}=([c_1-c_2\ c_2-c_1]*[v_3v_4v_5v_6]^T)//c_3$$

$$a_{3,1}=([c_1-c_2\ c_2-c_1]*[v_1v_2v_3v_4]^T)//c_3$$

$$a_{3,2}=([c_1-c_2\ c_2-c_1]*[v_5v_6v_7v_8]^T)//c_3$$

where QP is the quantization parameter of the block containing the pixel $v_5$, values $c_1$, $c_2$, $c_3$ are kernel constants used in a DCT, and values of $a_{3,0}$, $a_{3,1}$, $a_{3,2}$ are the discontinous component in each of the plurality of pixel sets, respectviely, and wherein d is a variable used to calculate $v_4'$ and $v_5'$ and denotes a result of a function CLIP (x, p, q) where x, p, and q are integers, wherein the function CLIP (x, p, q) clips x to a value between p and q, wherein $\delta$(condition) is a function generating 1 if the "condition" is true and generating 0 if the "condition" is not true, wherein T denotes a transpose of vector matrix, and wherein $v_1$, $v_2$, $v_6$, and $v_7$ denote boundary pixel values.

27. The method of claim 26, wherein:

$c_1$ and $c_2$ are approximated to an intenger and $c_3$ is approximated to a multiple of 2;

the DCT is a 4-point DCT used to determine the frequency information; and $a_{3,0}$, $a_{3,1}$, $a_{3,2}$ are evaluated from an inner product of the DCT kernel and the selected pixel set being S0, a first pixel set S1 and a second pixel set S2.

28. The method of claim 26, wherein $|a_{3,0}|<QP$ prevents over-smoothing.

29. The method as claimed in claim 20, further comprising performing the deblocking filtering process around horizontal and vertical block boundaries in a frame.

30. The method of claim 20, wherein the removing blocking artifacts in the second mode satisfies the following equation:

$$\{b_k;\ -4\leq k\leq 4\}=\{1,1,2,2,4,2,2,1,1\}//16$$

where $v_0$-$v_9$ are boundary pixels, QP is the quantization parameter of a block adjacent the block boundary, and $v_n$ is an adjusted pixel value, wherein $b_k$ and $p_{n+k}$ are variables used to calculate the adjusted pixel value $v_n$ where n is an integer among 1, 2, 3, 4, 5, 6, 7, and 8, wherein $b_k$ changes according to a value of k where k is one of −4, −3, −2, −1, 0, 1, 2, 3, 4, wherein $p_{n+k}$ is decided according to $p_m$ where m=n+k and m is an integer, wherein $P_m$ is one of boundary pixels values $v_0$ to $v_9$ according to given conditions of ($|v_1-v_0|<QP$) and ($|v_8-v_9|<QP$) and a value of m.

31. The method of claim 20, wherein the replacement pixel set contains a minimum magnitude of the at least one corresponding discontinuous component.

32. The method of claim 20, wherein:

the first mode is the default mode and the second mode is the DC offset mode; and each of the plurality of pixel sets has four pixels.

33. A method for removing blocking artifacts in a coding system comprising:

determining at least pixel sets S0, S1, S2 around a block boundary;

selecting one of a default mode and a DC offset mode as a deblocking mode based on an amount of blocking artifacts;

deblocking filtering of pixels adjacent the block boundary based on frequency information of the pixels adjacent to the block boundry, if the default mode is selected; and removing artifacts in the DC offset mode, if the DC offset mode is selected and a DC offset mode condition is satisfied, wherein the artifacts are removed in the DC offset mode according to the following equation:

$$\{b_k;\ -4\leq k\leq 4\}=\{1,1,2,2,4,2,2,1,1\}//16$$

wherein $v_0$-$v_9$ are boundary pixels, QP is the quantization parameter of a block adjacent the block boundary, and $v_n$ is an adjusted pixel value,

*wherein $b_k$ and $p_{n+k}$ are variables used to calculate the adjusted pixel value $v_n$ where n is an integer among 1, 2, 3, 4, 5, 6, 7, and 8,*

*wherein $b_k$ changes according to a value of k where k is one of −4, −3, −2, −1, 0, 1, 2, 3, 4,*

*wherein $p_{n+1}$ is decided according to $p_m$ where m=n+1 and m is an integer,*

*wherein $P_m$ is one of boundary pixels values $v_0$ to $v_9$ according to given conditions of ($|v_1-v_0|<QP$) and ($|v_8-v_9|<QP$) and a value of m.*

*34. The method of claim 33, wherein the deblocking filtering step comprises:*

*obtaining frequency information for each of the plurality of pixel sets S0, S1, S2;*

*replacing a magnitude of at least one discontinuous component in the frequency domain of a selected pixel set S0 of the plurality of pixel sets belonging to the block boundary with a magnitude of at least one corresponding discontinuous component belonging to a replacement pixel set S1, S2 of the plurality of pixel sets near the block boundary; and*

*applying the replaced frequency information of the selected pixel set S0 to the spatial domain to remove the blocking artifacts.*

*35. The method of claim 33, further comprising determining a mode decision value, wherein the DC offset mode is selected if the mode decision value is greater than a first threshold value, wherein mode decision value is determined based on the following equation:*

$$\text{mode decision value}=\phi(v_0-v_1)+\phi(v_1-v_2)+\phi(v_2-v_3)+\phi(v_3-v_4)+\phi(v_4-v_5)+\phi(v_5-v_1)+\phi(v_7-v_8)+\phi(v_8-v_9),$$

*wherein $\phi(\gamma)=1$ when $|\gamma|\leq$ a second threshold value and $\phi(\gamma)=0$ otherwise,*

*wherein $v_0$-$v_9$ are boundary pixel values, and*

*wherein $\phi(\gamma)$ is a function generating 1 or 0 according to $|\gamma|$ and $\gamma$ is a variable denoting a result of substraction of two given boundary pixel values.*

*36. The method of claim 33, wherein:*

*the DC offset mode condition is satisfied when an absolute value of a maximum data value minus a minimum data value in block boundary pixels is smaller than 2QP; and*

*the maximum data value=MAX($v_1$, $v_2$, $v_3$, $v_4$, $v_5$, $v_6$, $v_7$, $v_8$), the minimum data value=MIN($v_1$, $v_2$, $v_3$, $v_4$, $v_5$, $v_6$, $V_7$, $v_8$), QP is the quantization parameter of a block adjacent the block boundary and $v_1$-$v_8$ are the block boundary pixels.*

*37. The method of claim 33, wherein the deblocking filtering in the default mode is performed by replacing the magnitude of the discontinuous component of pixels $v_4$ and $v_5$ sandwiching the block boundary with $v_4'$ and $v_5'$, according to the following equation:*

$$v_4'=v_4-d$$

$$v_5'=v_5+d$$

$$d=CLIP(c_2\cdot(a_{3,0}'-a_{3,0})//c_3,0,(v_4-v_5)/2)*\delta(|a_{3,0}|<QP)$$

$$a_{3,0}'=SIGN(a_{3,0})*MIN(|a_{3,0}|,|a_{3,1}|,|a_{3,2}|)$$

$$a_{3,0}=([c_1-c_2\ c_2-c_1]*[v_3v_4v_5v_6]^T)//c_3$$

$$a_{3,1}=([c_1-c_2\ c_2-c_1]*[v_1v_2v_3v_4]^T)//c_3$$

$$a_{3,2}=([c_1-c_2c_2-c_1]*[v_5v_6v_7v_8]^T)//c_3,$$

*where QP is the quantization parameter of the block containing the pixel $v_5$, values $c_1$, $c_2$, $c_3$ are kernel constants used in a 4-point DCT, and values of $a_{3,0}$, $a_{3,1}$, $a_{3,2}$, are based on a simple inner product of the DCT kernel and the selected pixel set S0, a first pixel set S1 and the second pixel set S2, and*

*wherein d is a variable used to calculate $v_4'$ and $v_5'$ and denotes a result of a function CLIP (x, p, q) where x, p, and q are integers,*

*wherein the function CLIP (x, p, q) clips x to a value between p and q,*

*wherein $\delta$(condition) is a function generating 1 if the "condition" is true and generating 0 if the "condition" is not true,*

*wherein T denotes a transpose of vector matrix, and*

*wherein $v_1$, $v_2$, $v_6$, and $v_7$ denote boundary pixel values.*

*38. The method of claim 33, further comprising performing the determining through removing steps for each horizontal and vertical block boundaries in a frame.*

*39. The method of claim 20, wherein the method is performed by a smart phone.*

*40. The method of claim 33, wherein the method is performed by a smart phone.*

* * * * *